United States Patent Office 3,423,438
Patented Jan. 21, 1969

3,423,438
PROCESS FOR THE PREPARATION OF STEROIDS
John A. Edwards, Palo Alto, Calif., assignor to Syntex Corporation, Panama, Panama, a corporation of Panama
No Drawing. Filed Sept. 2, 1966, Ser. No. 576,825
U.S. Cl. 260—397.45                         6 Claims
Int. Cl. C07c 169/10, 169/08

This invention relates to a novel process for the preparation of organic compounds.

In particular, the invention pertains to a process for the preparation of $\Delta^{9(11)}$-estrone from estra-4,9-diene-3,17-dione.

$\Delta^{9(11)}$-Estrone is known to possess estrogenic activity and is an intermediate for the preparation of 9 and/or 11 substituted steroids, such as 9$\alpha$-fluoro-11$\beta$-hydroxyestrone.

The process of the present invention is practiced by treating the starting material, estra-4,9-diene-3,17-dione, with at least a molar equivalent, and preferably an amount greater than a molar equivalent, of selenium dioxide in a nonaqueous, inert organic solvent, or mixtures of such solvents. Typical solvents include alkanols, such as methanol, ethanol, or t-butanol, hydrocarbon carboxylic acids, such as formic acid or acetic acid, substituted and unsubstituted hydrocarbons, such as benzene or chlorobenzene, but generally t-butanol is the preferred solvent. Any excess greater than a molar equivalent of selenium dioxide may be utilized, the only limitation being economic factors, and the solubility of the reagent in the solvent. Preferably, the selenium dioxide is sublimed just prior to use. The process is carried out under dry conditions at temperatures ranging from about 10° C. to about 200° C., conveniently at the reflux temperature of the solvent or solvents used. The period of time required for the process will naturally depend upon temperature, the amount and purity of selenium dioxide used, the particular solvent used, and other factors. Generally, the reaction is completed within a period ranging from about 8 to about 48 hours, although shorter periods, such as one hour, or longer periods can be used. Alternatively, the reaction can be followed to completion by ultraviolet spectroscopy.

The product can be isolated by conventional techniques. For example, the mixture is filtered and the filtrate evaporated to dryness. The product and residue are dissolved in an inert organic solvent, refluxed with decolorizing charcoal, filtered, and evaporated to dryness. The product is then recrystallized.

This process can be similarly utilized with other 3-keto-$\Delta^{4,9}$-estranes, such as the corresponding 17-ketal, 17$\beta$-hydroxy, 17$\beta$-acyloxy, and the 17$\alpha$-alkyl, -alkenyl, and -alkynyl estranes. Typical examples of such estranes include: 17-methyl-17$\beta$-hydroxyestra-4,9-dien-3-one, 17$\alpha$-methylethynyl-17$\beta$-acetoxyestra-4,9-dien-3-one, and the like.

In order that those skilled in the art can more fully understand the present invention, the following examples are set forth. The examples are intended to merely illustrate the present invention and in no way should they be construed as expressing limitations of the present invention.

Example 1

A mixture of 1 g. of estra-4-,9-diene-3,17-dione, 50 ml. of t-utanol, 0.4 g. of recently sublimed selenium dioxide, and 0.2 ml. of pyridine is refluxed under nitrogen for 48 hours, cooled and filtered through Celite diatomaceous earth. The filtrate is evaporated under reduced pressure and the residue dissolved in acetone. This solution is refluxed in the presence of charcoal for one hour, filtered through Celite diatomaceous earth and evaporated. The residue is then chromatographed on neutral alumina to yield 3-hydroxyestra1,3,5(10),9(11)-tetraen-17-one.

Example 2

A mixture of 1 g. of estra-4,9-diene-3,17-dione, 1 g. of selenium dioxide and 50 ml. of chlorobenzene is refluxed for 8 hours. Upon reaching room temperature, the mixture is filtered through Celite diatomaceous earth and a solution of 1.3 g. of sodium acetate in 12.5 ml. of water is then added. This mixture is then steam distilled and the aqueous residue is cooled, acidified with dilute hydrochloric acid, and extracted with chloroform. The residue is then chromatographed on silica gel to yield 3-hydroxyestra-1,3,5(10),9(11)-tetraen-17-one which is further purified through recrystallization from acetone.

Example 3

To a solution of 27.0 g. (0.1 mole) of estra-4,9-diene-3,17-dione, 500 ml. of t-butanol and 5 ml. of glacial acetic acid, 55.5 g. (0.5 mole) of selenium dioxide are added. The mixture is refluxed for 20 hours under dry conditions and then it is filtered after cooling. The filtrate is evaporated to dryness, and the product and residue are taken up in benzene. The benzene solution is refluxed with decolorizing charcoal for 5 minutes and then filtered. After it has cooled, the benzene solution is washed with several portions of water, dried, and evaporated to dryness to yield 3$\beta$-hydroxyestra-1,3,5(10),9(11)-tetraen-17-one which is recrystallized from methanol:water.

Example 4

Thirty grams of selenium dioxide are added to a solution consisting of 30 g. of 17$\alpha$-ethynyl-17$\beta$-hydroxyestra-4,9-dien-3-one in 1 liter of chlorobenzene and the mixture is refluxed for 15 hours. The mixture is filtered through a bed of filter aid after it has cooled, and then 140 ml. of an aqueous 10% sodium acetate solution is added to the filtrate. The resulting mixture is steam distilled until substantially all the chlorobenzene has been distilled over, the aqueous residue is cooled, carefully acidified and then extracted with methylene chloride. The extractant is dried and chromatographed to yield 17$\alpha$-ethynylestra-1,3,5(10),9(11)-tetraene-3$\beta$,17$\beta$-diol.

What is claimed is:

1. A process for the preparation of a 3-hydroxy-$\Delta^{1,3,5(10),9(11)}$-steroid of the estrane series which comprises treating a corresponding 3-keto-$\Delta^{4,9}$-steroid with at least a molar equivalent of selenium dioxide.

2. A process according to claim 1 wherein a 3-hydroxy-$\Delta^{1,3,5(10),9(11)}$-steroid is $\Delta^{9(11)}$-estrone and the corresponding 3-keto-$\Delta^{4,9}$-steroid is estra-4,9-diene-3,17-dione.

3. A process according to claim 1 wherein the process is conducted at temperatures ranging from 10° C. to about 200° C.

4. A process according to claim 1 wherein the process is conducted in a nonaqueous inert organic solvent.

5. A process according to claim 1 wherein an amount of selenium dioxide greater than a molar equivalent is employed.

6. A process according to claim 1 wherein the 3-keto-$\Delta^{4,9}$-steroid is estra-4,9-diene-3,17-dione which is treated with selenium dioxide, in amounts greater than a molar equivalent, in a nonaqueous, inert organic solvent at a temperature ranging from about 10° C. to about 200° C., for a period of time ranging from about 8 hours to about 48 hours or more.

No references cited.

HENRY A. FRENCH, *Primary Examiner.*

U.S. Cl. X.R.

260—239.55, 397.5, 999